United States Patent
Mullia Lakshminarayana et al.

(10) Patent No.: US 12,548,241 B2
(45) Date of Patent: Feb. 10, 2026

(54) HIGH-FIDELITY THREE-DIMENSIONAL ASSET ENCODING

(71) Applicant: Adobe Inc., San Jose, CA (US)

(72) Inventors: Krishna Bhargava Mullia Lakshminarayana, San Francisco, CA (US); Valentin Deschaintre, London (GB); Nathan Carr, San Jose, CA (US); Milos Hasan, San Jose, CA (US); Bailey Miller, Pittsburgh, PA (US)

(73) Assignee: Adobe Inc., San Jose, CA (US)

( * ) Notice: Subject to any disclaimer, the term of this patent is extended or adjusted under 35 U.S.C. 154(b) by 254 days.

(21) Appl. No.: 18/132,714

(22) Filed: Apr. 10, 2023

(65) Prior Publication Data

US 2024/0338888 A1  Oct. 10, 2024

(51) Int. Cl.
*G06T 15/50* (2011.01)
*G06T 9/00* (2006.01)
*G06T 15/04* (2011.01)
*G06T 17/20* (2006.01)

(52) U.S. Cl.
CPC ............ *G06T 15/50* (2013.01); *G06T 9/001* (2013.01); *G06T 15/04* (2013.01); *G06T 17/20* (2013.01)

(58) Field of Classification Search
CPC ...................................................... G06T 15/04
See application file for complete search history.

(56) References Cited

PUBLICATIONS

Thies, Justus, Michael Zollhofer, and Matthias Niebner. "Deferred neural rendering: Image synthesis using neural textures." Acm Transactions on Graphics (TOG) 38.4 (2019): 1-12. (Year: 2019).*
Müller, Thomas, et al. "Instant neural graphics primitives with a multiresolution hash encoding." ACM transactions on graphics (TOG) 41.4 (2022): 1-15. (Year: 2022).*
Cai, Guangyan, et al. "Physics-Based Inverse Rendering using Combined Implicit and Explicit Geometries," Computer Graphics Forum, vol. 41. No. 4, arXiv preprint arXiv:2205.01242, Jul. 8, 2022, 18 pages.
Kuznetsov, Alexandr, et al., "NeuMIP: Multi-resolution neural materials", ACM Transactions on Graphics (TOG) 40.4, Article 175, Aug. 2021, pp. 175:1-175:13.

(Continued)

*Primary Examiner* — Ryan Mcculley
(74) *Attorney, Agent, or Firm* — Kilpatrick Townsend & Stockton LLP

(57) ABSTRACT

Certain aspects and features of this disclosure relate to rendering images by training a neural material and applying the material map to a coarse geometry to provide high-fidelity asset encoding. For example, training can involve sampling for a set of lighting and camera configurations arranged to render an image of a target asset. A value for a loss function comparing the target asset with the neural material can be optimized to train the neural material to encode a high-fidelity model of the target asset. This technique restricts the application of the neural material to a specific predetermined geometry, resulting in a reproducible asset that can be used efficiently. Such an asset can be deployed, as examples, to mobile devices or to the web, where the computational budget is limited, and nevertheless produce highly detailed images.

20 Claims, 8 Drawing Sheets

(56) References Cited

PUBLICATIONS

Kuznetsov, Alexandr, et al. "Rendering Neural Materials on Curved Surfaces." In Special Interest Group on Computer Graphics and Interactive Techniques Conference Proceedings, ACM SIGGRAPH 2022 Conference Proceedings, Aug. 2022, 9 pages.
Mildenhall, Ben, et al. "Nerf: Representing scenes as neural radiance fields for view synthesis", Communications of the ACM, vol. 65.1, Jan. 2022, pp. 99-106, (original version published in Proceedings of the 2020 European Conference on Computer Vision).
Oechsle, Michael, et al, "Unisurf: Unifying neural implicit surfaces and radiance fields for multi-view reconstruction", Proceedings of the IEEE/CVF International Conference on Computer Vision, 2021, pp. 5589-5599.
Shen, Tianchang, et al., "Deep marching tetrahedra: a hybrid representation for high-resolution 3d shape synthesis", Advances in Neural Information Processing Systems 34, 2021, pp. 1-15.
Wang, Qianqian, et al., "Ibrnet: Learning multi-view image-based rendering", Proceedings of the IEEE/CVF Conference on Computer Vision and Pattern Recognition, 2021, pp. 4690-4699.
Yariv, Lior, et al., "Volume rendering of neural implicit surfaces", Advances in Neural Information Processing Systems 34, 2021, pp. 1-11.
Yariv, Lior, et al., "Multiview neural surface reconstruction by disentangling geometry and appearance", Advances in Neural Information Processing Systems 33, 2020, pp. 1-11.

\* cited by examiner

HIGH-FIDELITY THREE-DIMENSIONAL ASSET ENCODING

TECHNICAL FIELD

The present disclosure generally relates to graphical image editing. More specifically, but not by way of limitation, the present disclosure relates to programmatic techniques for encoding highly detailed three-dimensional (3D) assets to be used in rendering realistic images.

BACKGROUND

Graphics design software applications are used for a number of different functions connected to manipulating or editing digital images. For example, such software applications may be used to generate images of objects for marketing purposes, gaming, augmented reality, and other visual display techniques. Computer graphics applications can model highly detailed three-dimensional (3D) assets as a combination of complex geometry and material textures. Geometric complexity, used to achieve realism, can be obtained by methods like displacement mapping, which applies a height field to a highly tessellated mesh. Materials can be represented by spatially varying bidirectional reflectance distribution functions (BRDFs), whose parameters are driven by a collection of high-resolution textures like albedo, roughness etc.

SUMMARY

Certain aspects and features of the present disclosure relate to rendering images by training a neural material and applying the material map to a coarse geometry to provide high-fidelity 3D asset encoding. For example, a method involves sampling for a set of lighting and camera configurations arranged to render an image of a target 3D asset. The method further involves training a neural material by optimizing a value for a loss function comparing the target 3D asset with the neural material over the set of lighting and camera configurations. The method also involves applying, in response to the optimizing, the neural material to the coarse, geometric proxy to encode a high-fidelity model of the target 3D asset. The method can also involve rendering a high-fidelity image of the target 3D asset using the high-fidelity model. The rendering can be carried out locally or by deploying the high-fidelity model for use on a remote device.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
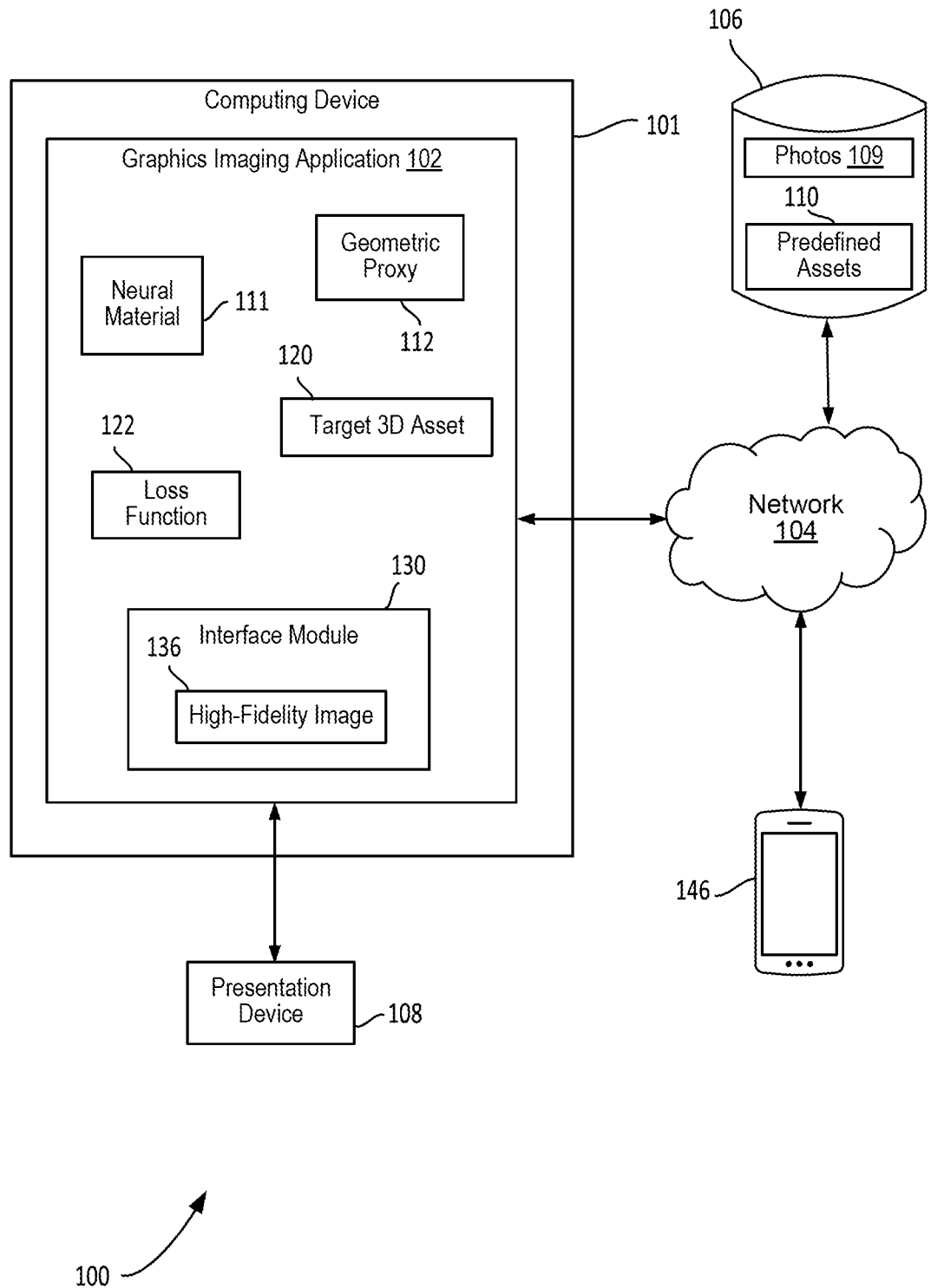
FIG. 1 is a diagram showing an example of a computing environment for high-fidelity 3D asset encoding according to certain embodiments.

Realistic-looking 3D images can be an important component of interactive applications such as those used for gaming, shopping, and augmented reality applications, as examples. Existing graphics design software can model highly detailed 3D assets as a combination of complex geometry and material textures. Geometric complexity can be obtained by methods like displacement mapping, which applies a height field to a highly tessellated mesh to obtain high degrees of visual saliency and realism.

Authoring high-resolution detail in textures for synthetic assets is a complex and time-consuming task. Inferring these textures from real-world materials also requires effort and expertise, and thus may not be suitable for situations where detailed 3D objects must be updated regularly. The use of complex geometries and material textures for rendering realistic images is both memory-intensive and computationally expensive. These demands can create performance issues when 3D images are deployed to applications for mobile computing or the web.

Embodiments described herein address the above issues by using neural representations. A 3D asset is encoded as a combination of a neural material and a fixed, coarse geometry. This technique restricts the application of the neural material map to a specific predetermined geometry, resulting in a reproducible asset that can be used efficiently. Such an asset can be deployed, as examples, to mobile devices or to the web, where the computational budget is limited, and nevertheless produce highly detailed images. A geometry to be used for the application of the neural material can be produced from a real-world object, which may be captured in photographs, or from a synthetic object produced by graphics design techniques. The ability to use photographs is useful in marketing applications, including those that make use of augmented reality.

For example, a graphics imaging application is loaded with a representation of a material. The material can be used to produce a neural material by training the representation with data generated by simulating the illumination of the material from various directions. In addition to illumination from various directions, various camera/view directions are also used for training. Texture coordinates can be used as input to a neural material function. The graphics imaging application can access a library of 3D objects, either photographic representations of real-world objects or stored representations of synthesized, graphically designed objects. An appropriate object can be selected and a proxy for the object is programmatically produced and used to inform the production of the trained neural material. The training adapts a material model to the varying curvature and local structure of a geometric proxy. A target asset is optimized to train the neural material, resulting in a high-fidelity model of the target asset that can be used to render a realistic image. The neural material trained by this technique may be stored and transferred to a new geometry. Such reuse of a trained, neural material can improve workflow efficiency.

In some examples, the graphics imaging application trains the neural material for a coarse, geometric proxy by sampling for a set of lighting and camera configurations arranged to render an image of the target 3D asset. A value for a loss function comparing the target 3D asset with the neural material is used to optimize the neural material applied to the geometric proxy to encode the high-fidelity model of the target 3D asset. A high-fidelity image corresponding to the target 3D asset can be rendered using the model. Rendering can take place on the computer system running the graphics imaging application, or the asset can be deployed to remote devices for rendering.

In some examples, a per-face texture mapped polygonal mesh can be used as a geometric proxy for a 3D asset. If a graphically created asset is accessed as input, a signed distance function using a sparse feature grid can be used to produce the geometric proxy. If a real-world 3D object is to be used, images, such as digital photographs, can be used to generate the geometric proxy.

The explicit pairing of coarse geometry with a neural material improves efficiency by providing an underlying geometric model with reduced complexity. Some of the geometric complexity can be offloaded from the geometric model into the neural material, which reduces the cost of storing the geometry and of computing ray-surface intersection queries. By using the representational power of the neural material, this improvement in storage and computational demand can often be obtained with limited loss of asset details. The approach can also be generalized to implicit surfaces.

FIG. 1 is a diagram showing an example of a computing environment for high-fidelity 3D asset encoding according to certain embodiments. The computing environment 100 includes a computing device 101 that executes a graphics imaging application 102, a memory device 106, and a presentation device 108 that is controlled based on the graphics imaging application 102. The memory device 106 is communicatively coupled to computing device 101 using network 104. Memory device 106 is configured to store existing digital objects such as digital photographs (photos) in database 109 or graphically predefined assets in database 110. The photos may be those of real-world 3D objects. In this example, the graphics imaging application 102 includes a neural material 111, which is or is being trained by application to a coarse, geometric proxy 112. In some examples, the neural material is trained to fit the coarse, geometric proxy to model the target 3D asset 120. In order to achieve highly detailed renderings based on the neural material 111, a loss function 122 is used to optimize the neural material to the coarse geometric proxy 112, thus training the neural material. The optimization process minimizes the statistical difference between the geometric proxy and the neural material. The final, optimized value of the loss function 122 can be used to obtain the neural material map for application to the geometric proxy to produce a realistic encoded model.

In the example of FIG. 1, the graphics imaging application 102 also includes an interface module 130. In some embodiments, the graphics imaging application 102 uses inputs related to selecting photographs from a database 109 or selecting graphical assets from a database 110 to identify and generate the coarse geometric proxy 112 for having the neural material 111 applied. The graphics imaging application 102 may provide prompts or menus to the output interface module 130 for display at the presentation device 108, which can be a local presentation device or a computing device that is remotely accessible over a data network.

The graphics imaging application includes one or more software modules, for example, a rendering module (not shown) that renders images, such as rendered high-fidelity image 136 corresponding to the target 3D asset 120. Alternatively, the encoded model can be deployed to a remote computing device, for example, computing device 146, for rendering. In this example, computing device 101 deploys the encoded model using network 104. Computing device 146 is a mobile computing device, but the encoded model can be deployed to any computing device for rendering, including a tablet computer, a notebook computer, or a desktop personal computer. The encoded model can also be deployed to a web server to be rendered via a web page displayed on a client computing device.

Figure 2:
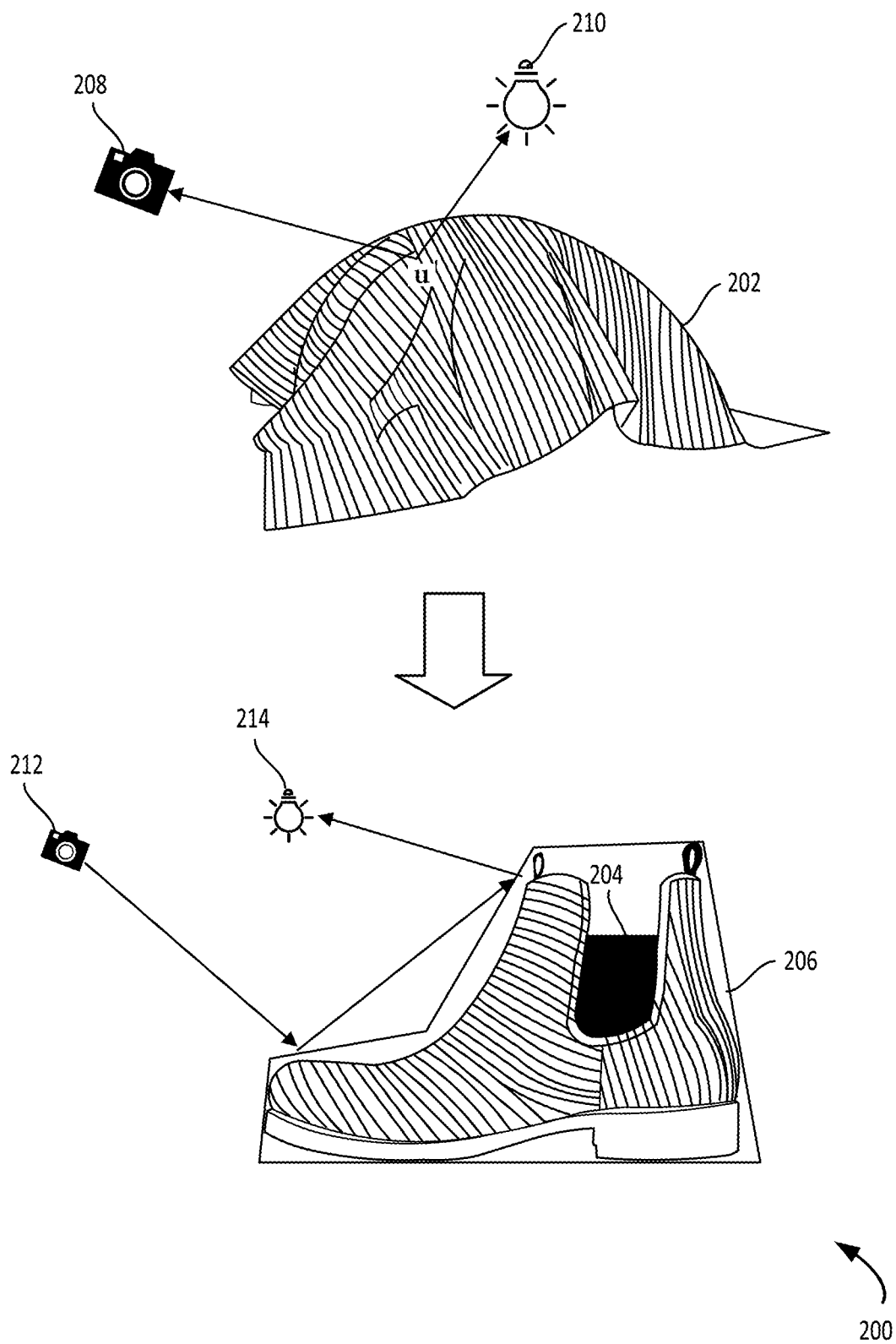
FIG. 2 is an example of training a neural material and applying the material map to a coarse geometry to provide high-fidelity 3D asset encoding according to certain embodiments.

FIG. 2 is an example 200 of training a neural material and applying the material map to a coarse geometry to provide high-fidelity 3D asset encoding according to certain embodiments. In this example, a neural material 202 is trained with respect to a specific geometric model 204. The training adapts the material model to the varying curvature and local structure of a geometric model as part of training the neural material.

To encode a 3D asset, a coarse, geometric proxy is generated using techniques such as mesh simplification. The degree to which the surface is simplified to generate the proxy can vary and will impact the degree to which the initial 3D asset can be compressed into the new representation. An overly simplified surface may lose detail that the neural material cannot recover, while a highly detailed surface will lead to slower rendering times. In example 200, the coarse, geometric proxy is a coarse bounding geometry 206.

In one example, the neural material 202 is trained for the coarse geometry 206 through a gradient-based learning procedure. At each iteration of training, a lighting and camera configuration, which is used to render an image of the encoded 3D asset is sampled. One camera and lighting position as it corresponds to neural material 202 is represented in FIG. 2 by camera 208 and light source 210, respectively. One camera and lighting position as it corresponds to coarse geometry 206 is represented in FIG. 2 by camera 212 and light source 214, respectively. Alternatively, every point query of the surface can be defined by a uniquely sampled viewing and lighting direction, since these can be conveniently computed using path-tracing. The texture coordinate on the surface for the neural material 202 with the lighting and camera positions shown is u, which is used in the bidirectional texture function to give $\rho$ (u, $\omega_o$, $\omega_i$), which includes the output and input angles $\omega_o$ and $\omega_i$ for the camera and lighting rays, respectively, at coordinate 11.

Figure 3:
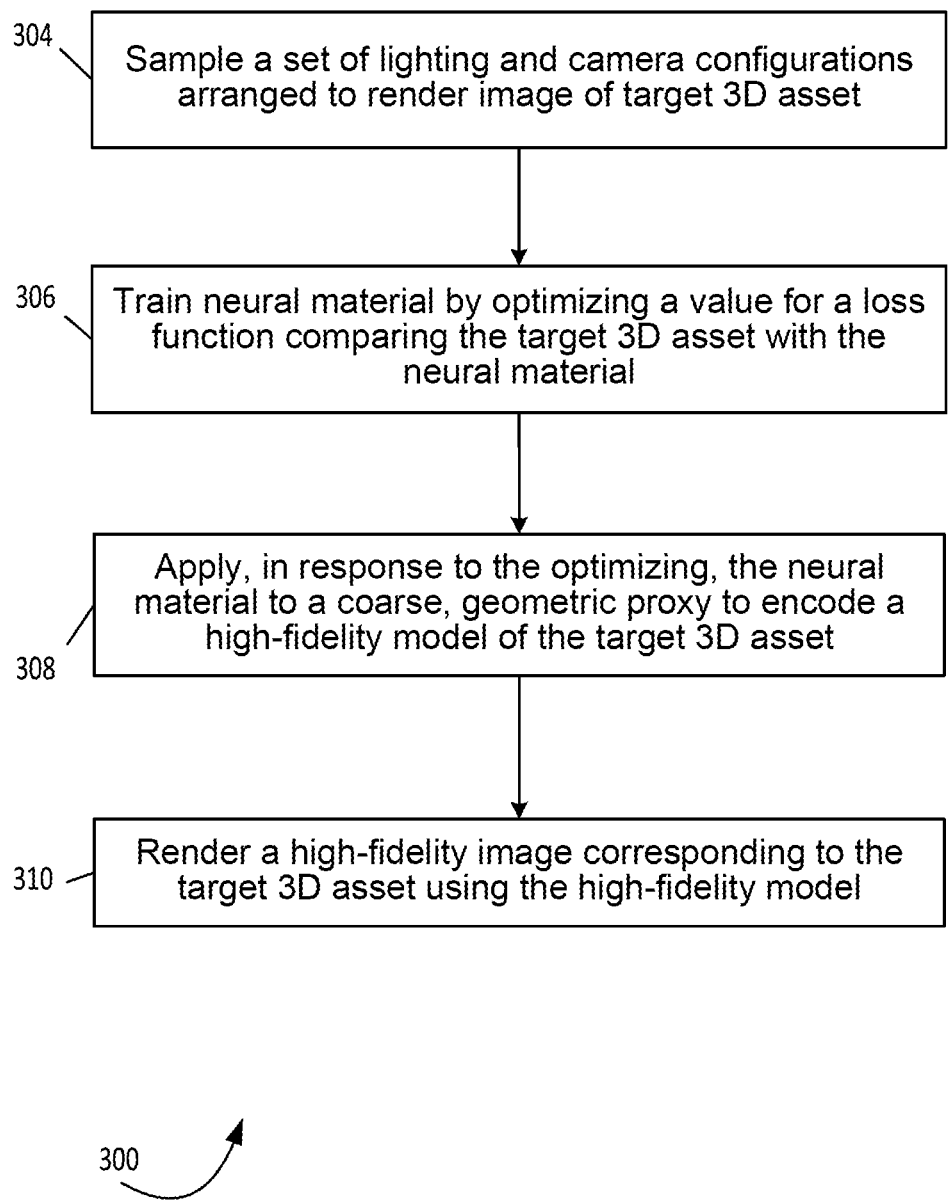
FIG. 3 is a flowchart of an example of a process for high-fidelity 3D asset encoding according to some embodiments.

FIG. 3 is a flowchart of an example 300 of a process for high-fidelity 3D asset encoding according to some embodiments. In this example, a computing device carries out the process by executing suitable program code, for example, computer program code executable to provide a graphics imaging application such as graphics imaging application 102. At block 304, the computing device samples a set of lighting and camera configurations arranged to render an image of the target 3D asset. For example, the neural material 202 can be trained using a camera configuration including camera 208 and lighting configuration using light source 210. At block 306, the computing device trains the neural material by optimizing the value of a loss function comparing the target 3D asset with the neural material as currently trained. Camera and lighting positions can be used to render the target 3D asset; the rendering can be used to compute the value of the loss function. As an alternative, every point query of the surface can be based on a uniquely sampled viewing and lighting direction, and these are computed using path-tracing. In this example, the loss is computed with respect to a rendering of the original 3D asset. After the neural material is trained, the neural material can be deployed along with the coarse geometric proxy as a model.

At block 308 of FIG. 3, the computing device applies, in response to the optimizing, the neural material to the coarse geometric proxy to encode a high-fidelity model of the target 3D asset. At block 310, a high-fidelity image corresponding to the target 3D asset is rendered using the high-fidelity model. The image can be rendered by the computing device that produced the encoded model. Alternatively, the image can be rendered by deploying the encoded model to another computing device, such as a mobile computing device 146 or a web server. As another alternative, the trained, neural material map can be stored in memory and expeditiously retrained for a different geometry at a future time.

The processes and systems described herein can be useful in e-commerce. For example, if there is a need to display a very geometrically complex object, for example a fuzzy pillow or a furry teddy bear, or a carpet or rug that's got lots of fine fibers, it would be computationally expensive to stream all of the information representing those details across the Internet to be rendered on a user's computing device. Rendering by itself is also computationally expensive without the encoding to neural form. The processes and systems described herein can compress all the requisite information in a package that can be efficiently delivered to and displayed on a variety of computing devices.

Other endeavors in which the embodiments described herein can be used include augmented reality, virtual reality, and video gaming. The compressed information in an efficient package can be used for rendering objects in virtual scenes. A virtual scene can be any artistic or realistic scene. For example, if a game environment includes a tree, instead of transmitting the geometric complexity of leaves over the network to be rendered with heavy computations on a device, the information can be bundled in the high-fidelity model for a more compact object that can be efficiently rendered. This model is particularly useful in the context of games or other technology with polygons for objects at varying distances, where it would also be computationally expensive to stream or render all of the information without the encoding to neural form. For example, when the tree gets farther from the viewer in the virtual environment, instead of rendering individual leaves, it can be easily rendered in a more minimalistic form using the high-fidelity model. A technique as described herein can be used to create an asset for the representation at a greater virtual distance while still using more processor-intensive techniques for closer views. Texture in the context of this disclosure can include color. Texture may also include the surface normal to provide the appearance of rough facets, for example, for the bark of the aforementioned tree.

Figure 4:
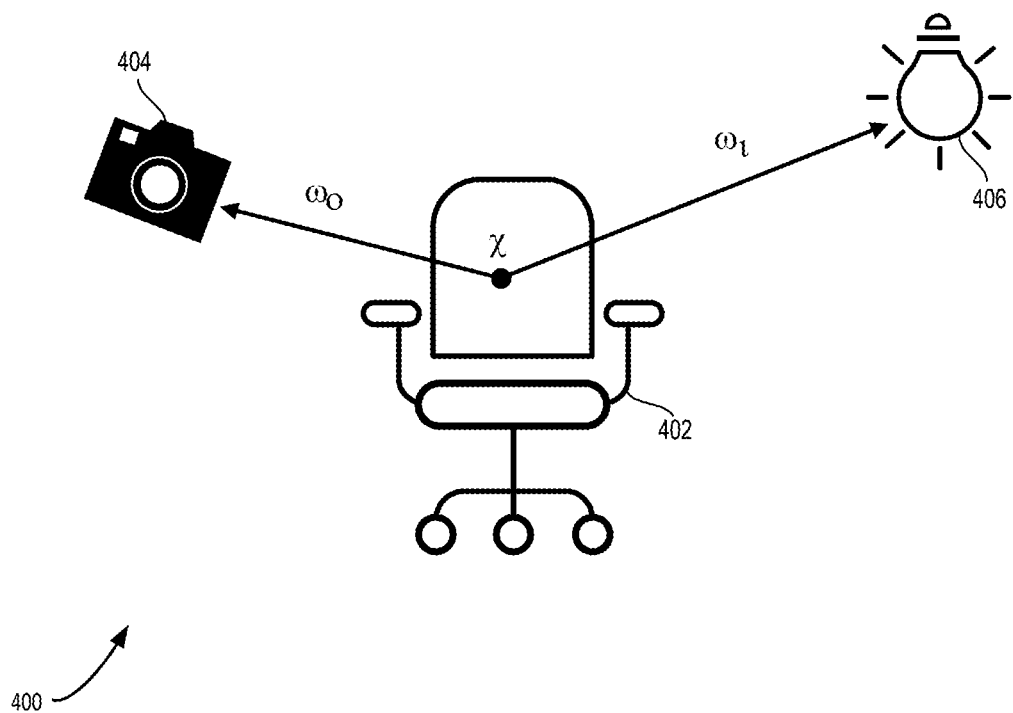
FIG. 4 is an example of a texture function for learning a material to be to be applied to new surfaces for high-fidelity 3D asset encoding according to certain embodiments.

FIG. 4 is an example 400 of learning a neural material from an existing asset in order to transfer the material to new surfaces. A material can be transferred from a real-world object such as one depicted in a digital photograph or from a graphically generated asset. A material is everything from an asset other than geometry and lighting. The new material can be captured using view synthesis and lighting, with the asset being observed under diverse view directions and lighting conditions.

In example 400, asset 402 is subject to view synthesis as represented by camera 404 and light source 406. When training a transferable material, the original geometry is not simplified and no regularization is applied, so that a simplified geometry is not learned. This prevents geometric details not related to the material model itself from being learned by the neural material. The success of generalizing a neural material to a new shape depends on a combination of how detailed the material is and the variety of lighting configurations and local geometric conditions under which the material is computationally observed.

The exitant radiance/for using the bidirectional texture function (BTF) as shown in FIG. 4 is:

$$L(x \to \omega_o) = \int_{S^2} \rho(x, \omega_o, \omega_i) L(x \leftarrow \omega_i) d\omega_i,$$

where S is the surface area. A large class of materials can be modeled with a BTF. Even materials such as fur can be approximated by a BTF.

Figure 5:
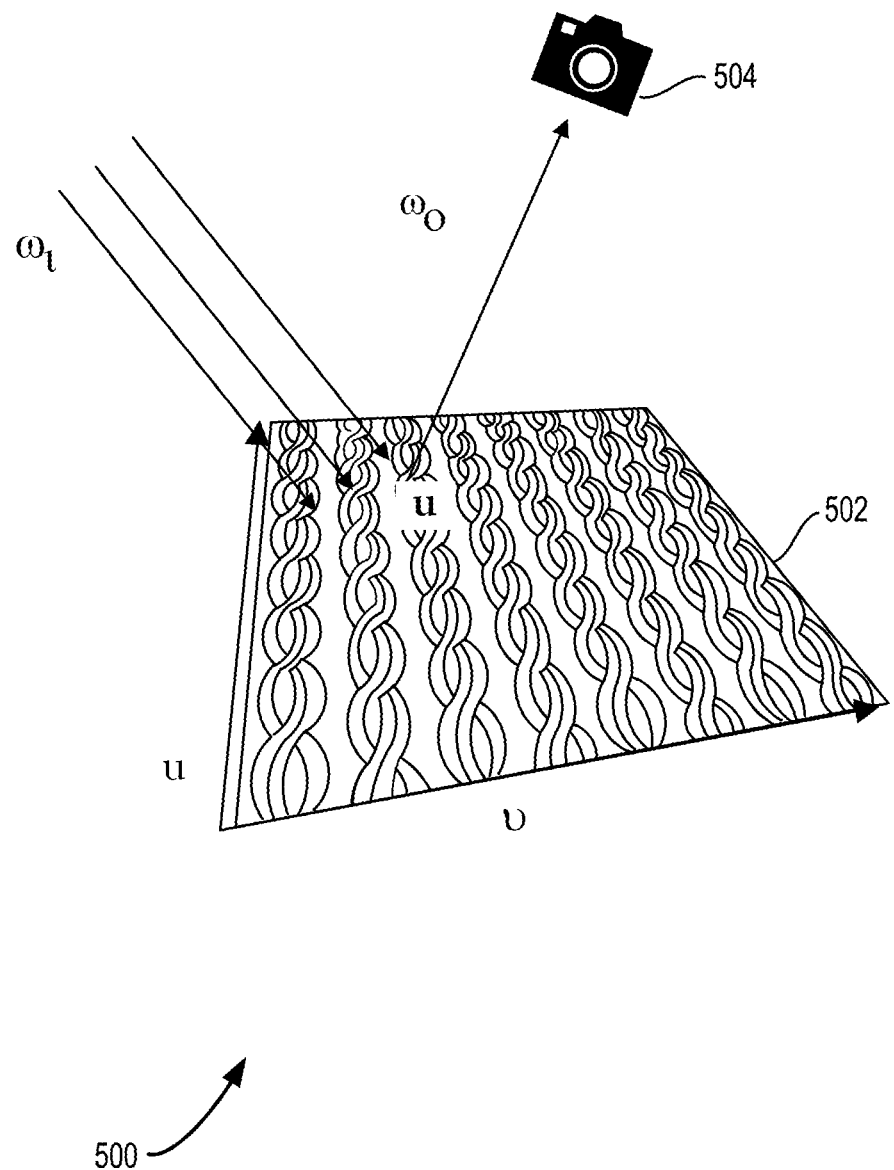
FIG. 5 is an example of training a neural material to provide high-fidelity 3D asset encoding according to certain embodiments.

FIG. 5 is an example 500 of training a neural material to provide high-fidelity 3D asset encoding according to certain embodiments. In this example, the training data is generated from illuminating the material 502 of dimensions u, v on a flat plane. Example 500 is shown with rays impinging on the angle $\omega_i$ while camera 504 is sampling at the angle $\omega_o$. Example 500 represents an alternative to training as shown in FIG. 2 in which texture coordinates on an irregular surface are used. In some examples, the neural material can be initialized using the flat plane and then trained for an irregular or curved surface.

Figure 6:
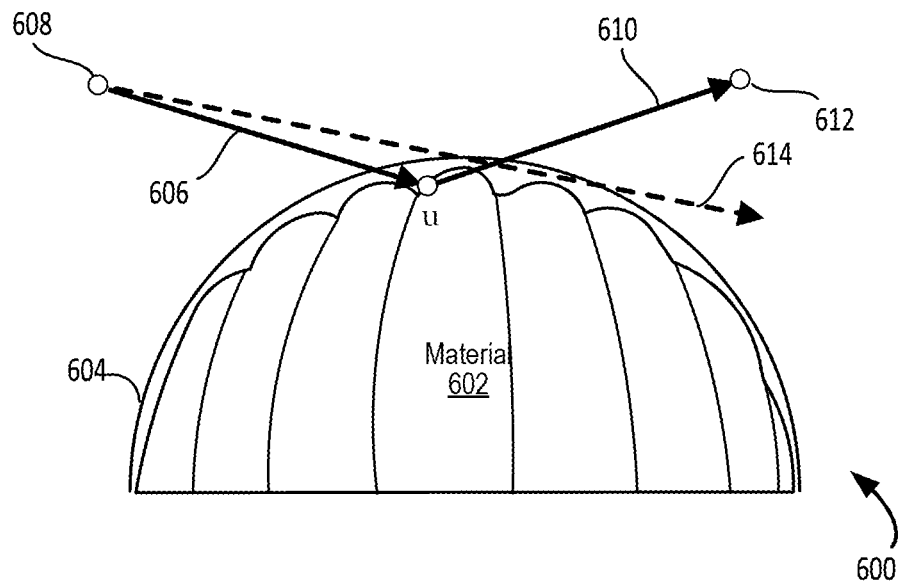
FIG. 6 is an example of training a neural material on a curved surface to provide high-fidelity 3D asset encoding according to certain embodiments.

Training neural materials on curved surfaces can involve accounting for "silhouettes," which are irregularities on a surface that would cause some rays impinging at a given angle to pass through the outer boundary of the surface while others scatter. The variable α can be used by assigning it a value of one for rays that hit the surface and zero for rays that miss the surface. FIG. 6 is an example 600 of training a neural material on a curved surface to provide high-fidelity 3D asset encoding.

In example 600, material 602 is represented by bounding geometry 604, which is treated as transparent. Ray 606 from point 608 hits the irregular surface of material 602 resulting in ray 610 arriving at point 612. Thus, for ray 606, α=1. Ray 614 misses the irregular surface of material 602 and passes through the transparent bounding geometry. For ray 614, α=0. The function with a transparency term is:

$$L(u \to \omega_o) = \alpha(u, \kappa, \omega_o) \int_{S^2} \rho(u, \kappa, \omega_o, \omega_i) L(u \leftarrow \omega_i) d\omega_i,$$

where the function of α represents the transparency and κ represents curvature.

Figure 7:
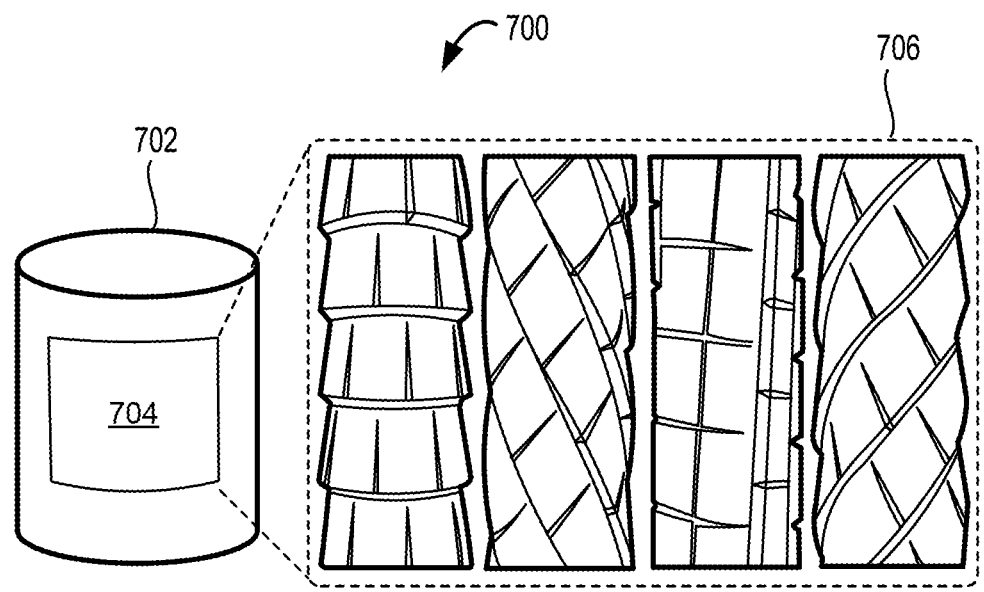
FIG. 7 is another example of training a neural material on a curved surface to provide high-fidelity 3D asset encoding according to certain embodiments.

FIG. 7 is another example 700 of training a neural material on curved surfaces to provide high-fidelity 3D asset encoding according to certain embodiments. In example 700 a cylinder 702 is used and a sampling region 704 is selected based in uv coordinates. A number of uv rotations and translations 706 are carried out for training.

To use learning neural material on a more complex geometry, geometry-specific transparency and reflectance can be considered in order to achieve realistic images. For example, position features that are to be encoded in the high-fidelity model for rendering can be generated using a multiresolution hash grid. In this case, the exitant radiance discussed immediately above becomes:

$$L(x \to \omega_o) = \alpha(\theta(x), \omega_o) \int_{S^2} \rho(\theta(x), \omega_o, \omega_i) L(x \leftarrow \omega_i) d\omega_i.$$

In the above equation, position features in the geometry-specific transparency and reflectance terms (α and ρ) are no longer u, v based since there is no need to transfer these features. Instead, these features are defined by θ(x).

If re-lightability is not needed, outgoing radiance the neural material can be trained for the surface (i.e., neural surface radiance). The alpha term from above is still learned to allow silhouettes, as in:

$$L(x \to \omega_o) = \alpha(\theta(x), \omega_o) \rho(\theta(x), \omega_o).$$

Figure 8:
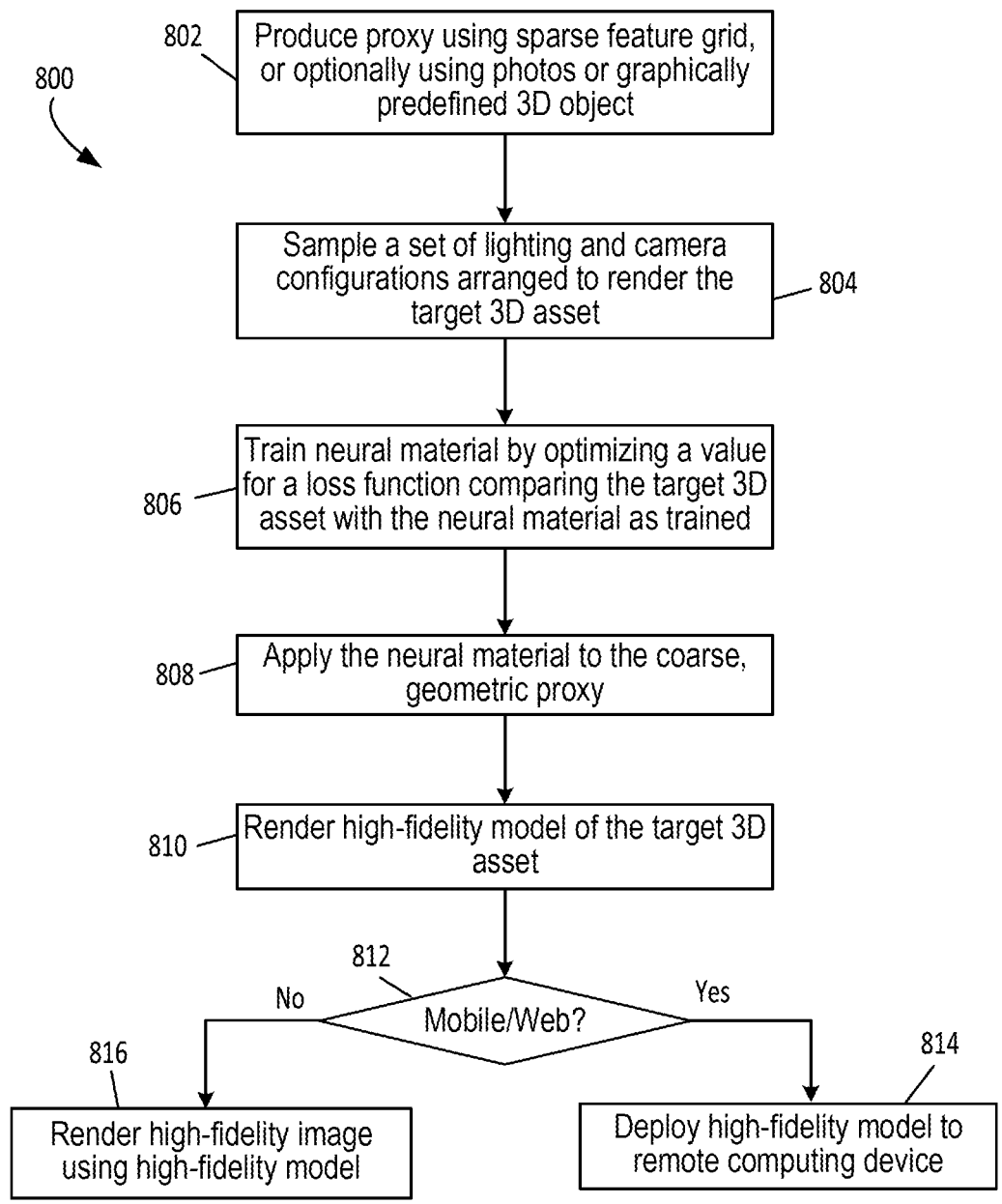
FIG. 8 is another flowchart of an example of a process for high-fidelity 3D asset encoding according to some embodiments.

FIG. 8 is a flowchart of another example of a process 800 for high-fidelity 3D asset encoding according to some embodiments. In this example, a computing device carries out the process by executing suitable program code, for example, computer program code for an application, such as graphics imaging application 102. At block 802, the computing device produces the geometric proxy. Any number of techniques may be used. In one example, the computing device texture maps the source asset. The texture mapping is carried out on a per-face basis. In this case, the geometric proxy will include a polygonal mesh. As another example, the geometric proxy can be created by calculating a signed distance function (SDF) using a sparse feature grid. Existing photos of a real-world 3D object can be used, or any other existing images can be used.

Traditional graphics can provide a range of expressive materials and many graphical objects can be stored as candidates for use in providing the coarse geometry, for example, in database 110 as shown in FIG. 1. These graphics may include high-quality displacement maps, anisotropic micro-structures, and even representations of realistic textures such as those of fur or hair. Such graphics may also employ techniques that provide representations of glittery or complex reflective surfaces.

The graphically predefined objects in this example are synthetic objects that reside in computer memory and are not necessarily a direct representation of an object in the same sense that a photograph would be. Such an object can be defined, as an example, by a 3D representation including triangles and fibers in geometric detail. To avoid the computing demands that would otherwise be required to deploy and render such an object, the neural network of the learning material described herein encodes the appearance and delivers an asset in a more efficient manner. If digital photographs are used for obtaining the coarse geometry, dozens or even hundreds of photos around a real-world object can be used and then the neural material representation is fit to the photos.

The coarse geometry of the proxy can be represented with anything from a polygonal mesh to an SDF. To ensure efficiency, a representation that allows for quick ray-surface intersections can be chosen. In addition to impacting the speed of ray-surface intersections, the choice of surface representation will also affect the available options for material features. For instance, polygonal meshes allow the utilization of the per-face texture mapping. An SDF uses an implicit function to represent geometry, while a sparse feature grid is a different representation by itself. In the context of encoding a 3D asset, features are fixed and not learned. Highly detailed geometry like that of a form including millions of triangles or hair fibers can be represented as a coarse mesh, with an order of magnitude lesser geometric definition. The desired geometry complexity is eventually encoded into the neural form so that the neural material that gets fit to the coarse geometry can provide visual complexity, but in a computationally lighter weight digital asset.

Continuing with FIG. 8, at block 804, the computing device samples a set of lighting and camera configurations arranged to render an image of the target 3D asset, in a similar manner a described with respect to block 304 of FIG. 3. In one example, sampling involves using texture coordinates on a surface of the neural material as input to a neural material function. At block 806, the computing device trains the neural material by optimization, using the value of the loss function. The loss function compares the original 3D asset with the neural material as currently trained to determine the optimized value. The value of the loss function serves as a measure of how well the neural material fits the geometric proxy. If the training involves many lighting directions, the 3D asset can also be viewed under varied lighting conditions. Alternatively, a variation can learn the asset under a fixed lighting configuration, allowing for novel view synthesis.

Still referring to FIG. 8, once the neural material is trained, it is finally applied to the geometric proxy at block 808. At block 810, the high-fidelity model of the target 3D asset is encoded. This computationally efficient model can be used to render the asset. The functions included in block 806 and 808 and discussed with respect to FIG. 8 can be used in implementing a step for encoding a high-fidelity model of the target 3D asset based on the lighting and camera configurations. At block 812, if the asset is to be deployed to one or more other computing devices, for example, mobile devices as part of an app or to a web server for use in serving web pages, the asset is deployed at block 814. Alternatively, the asset can be used to render the high-fidelity image locally in any virtual scene at block 816.

The trained neural material, more specifically, its mathematical definition, can be stored for use at a later time. A neural material can be used to encode high-fidelity models for a number of objects to be displayed as part of a web page, game, virtual reality environment, etc.

Figure 9:
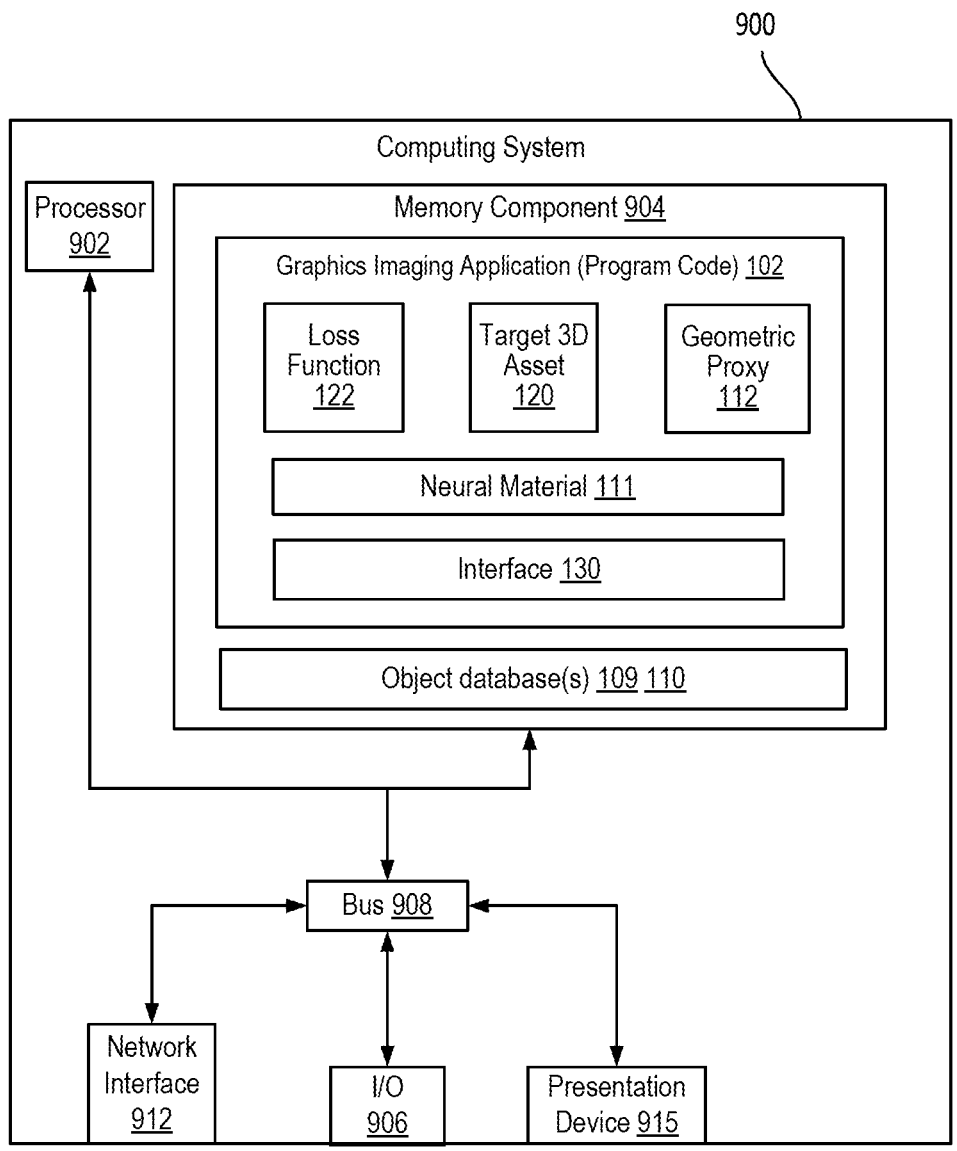
FIG. 9 is a diagram of an example of a computing system that can provide high-fidelity 3D asset encoding, according to certain embodiments.

FIG. 9 is a diagram of an example of a computing system that that can provide high-fidelity 3D asset encoding, according to certain embodiments. Computing system 900 includes a processing device 902 communicatively coupled to one or more memory devices. The processing device 902 executes computer-executable program code stored in the memory component 904. Examples of the processing device 902 include a microprocessor, an application-specific integrated circuit ("ASIC"), a field-programmable gate array ("FPGA"), or any other suitable processing device. The processing device 902 can include any number of processing devices, including a single processing device. The memory component 904 includes any suitable non-transitory computer-readable medium for storing data, program code instructions, or both. A computer-readable medium can include any electronic, optical, magnetic, or other storage or memory device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 9, the computing system 900 may also include a number of external or internal devices, for example, input or output devices. For example, the computing system 900 is shown with one or more input/output ("I/O") interfaces 906. An I/O interface 906 can receive input from input devices or provide output to output devices (not shown). Output may be provided using the output interface module 130 of the graphics imaging application 102. One or more buses 908 are also included in the computing system 900. The bus 908 communicatively couples one or more components of a respective one of the computing system 900. The processing device 902 executes program code that configures the computing system 900 to perform one or more of the operations described herein. The program code includes, for example, graphics imaging application 102 or other suitable applications that perform one or more operations described herein. The program code may be resident in the memory component 904 or any suitable computer-readable medium and may be executed by the processing device 902 or any other suitable processor. Memory component 904, during operation of the computing system, can store the target 3D asset 120, the geometric proxy 112, and neural material 111. Memory component 904 is also used to temporarily store loss function 122, including intermediate values used during optimizing the loss function 122.

The system 900 of FIG. 9 also includes a network interface device 912. The network interface device 912 includes any device or group of devices suitable for establishing a wired or wireless data connection to one or more data networks. Non-limiting examples of the network interface device 912 include an Ethernet network adapter, a wireless network adapter, and/or the like. The system 900 is able to communicate with one or more other computing devices (e.g., another computing device executing other software, not shown) via a data network (not shown) using the network interface device 912. Network interface device 912 can also be used to communicate with network or cloud storage used as a repository for stored 3D target assets, digital photographs, or graphical objects for use with the graphics imaging application 102. Such network or cloud storage can also include updated or archived versions of the graphics imaging application for distribution and installation.

Staying with FIG. 9, in some embodiments, the computing system 900 also includes the presentation device 915. A presentation device 915 can include any device or group of devices suitable for providing visual, auditory, or other suitable sensory output. In examples, presentation device 915 displays input and/or rendered images. Non-limiting examples of the presentation device 915 include a touchscreen, a monitor, a separate mobile computing device, etc. In some aspects, the presentation device 915 can include a remote client-computing device that communicates with the computing system 900 using one or more data networks. System 900 may be implemented as a unitary computing device, for example, a notebook or mobile computer. Alternatively, as an example, the various devices included in system 900 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "generating," "accessing," "processing," "computing," "determining," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
accessing a transferable material from a digital asset having an existing geometry;
sampling a set of lighting and camera configurations arranged to render an image of a target 3D asset;
generating position features for the target 3D asset using a multiresolution hash grid;
repeatedly rendering the target 3D asset using the set of lighting and camera configurations;
generating training data for a neural material by illuminating the neural material, initially for a flat plane, and subsequently for an irregular or curved surface, wherein the neural material represents the transferable material;
training, using the training data, the neural material by optimizing a value for a loss function comparing the target 3D asset with the neural material for each rendering of the target 3D asset;
applying, in response to the optimizing, the neural material as trained to a coarse, geometric proxy of the target 3D asset to encode, using the position features from the multiresolution hash grid, a high-fidelity model of the target 3D asset; and
rendering, using the high-fidelity model, a high-fidelity image corresponding to the target 3D asset with the transferable material applied.

2. The method of claim 1, further comprising per-face texture mapping an existing digital object to produce the coarse, geometric proxy, wherein the coarse, geometric proxy comprises a polygonal mesh.

3. The method of claim 1, wherein rendering the high-fidelity image comprises rendering the high-fidelity model in a virtual scene.

4. The method of claim 1, further comprising:
accessing images of a real-world 3D object; and
using the images to apply the neural material as trained to the coarse, geometric proxy.

5. The method of claim 1, wherein the set of lighting and camera configurations comprises a fixed lighting configuration to provide novel view synthesis.

6. The method of claim 1, wherein rendering the high-fidelity image comprises deploying the high-fidelity model to a remote device for the rendering.

7. The method of claim 1, wherein training the neural material further comprises using texture coordinates on a surface of the coarse, geometric proxy as input to a neural material function.

8. A system comprising:
a memory component; and
a processing device coupled to the memory component, the processing device to perform operations comprising:
accessing a transferable material from a digital asset having an existing geometry;
sampling a set of lighting and camera configurations arranged to render an image of a target 3D asset;
generating position features for the target 3D asset using a multiresolution hash grid;
repeatedly rendering the target 3D asset using the set of lighting and camera configurations;
generating training data for a neural material by illuminating the neural material, initially for a flat plane, and subsequently for an irregular or curved surface, wherein the neural material represents the transferable material;
training, using the training data, the neural material by optimizing a value for a loss function comparing the target 3D asset with the neural material for each rendering of the target 3D asset;
applying, in response to the optimizing, the neural material as trained to a coarse, geometric proxy of the target 3D asset to encode, using the position features from the multiresolution hash grid, a high-fidelity model of the target 3D asset; and
deploying the high-fidelity model to a remote device.

9. The system of claim 8, wherein the operations further comprise per-face texture mapping an existing digital object to produce the coarse, geometric proxy, wherein the coarse, geometric proxy comprises a polygonal mesh.

10. The system of claim 8, wherein the operations further comprise causing the remote device to render, using the high-fidelity model, a high-fidelity image in a virtual scene.

11. The system of claim 8, wherein the operations further comprise:
accessing images of a real-world 3D object; and
using the images to apply the neural material as trained to the coarse, geometric proxy.

12. The system of claim 8, wherein the set of lighting and camera configurations comprises a fixed lighting configuration to provide novel view synthesis.

13. The system of claim 8, wherein the operations further comprise causing the remote device to render a high-fidelity image using the high-fidelity model.

14. The system of claim 8, wherein the operation of training the neural material further comprises using texture coordinates on a surface of the coarse, geometric proxy as input to a neural material function.

15. A non-transitory computer-readable medium storing executable instructions, which when executed by a processing device, cause the processing device to perform operations comprising:
accessing a transferable material from a digital asset having an existing geometry;
sampling a set of lighting and camera configurations arranged to render an image of a target 3D asset;
generating position features for the target 3D asset using a multiresolution hash grid;
generating training data for a neural material by illuminating the neural material, initially for a flat plane, and subsequently for an irregular or curved surface, wherein the neural material represents the transferable material;

training, using the training data, the neural material by optimizing a value for a loss function comparing the target 3D asset with the neural material for each rendering of the target 3D asset;

a step for encoding, in response to the optimizing and using a geometric proxy of the target 3D asset, a high-fidelity model of the target 3D asset based on the set of lighting and camera configurations; and rendering, using the high-fidelity model, a high-fidelity image corresponding to the target 3D asset using the high-fidelity model with the transferable material applied.

16. The non-transitory computer-readable medium of claim 15, wherein the operations further comprise per-face texture mapping of an existing digital object to produce a coarse, geometric proxy for use in the step for encoding the high-fidelity model.

17. The non-transitory computer-readable medium of claim 16, wherein the geometric proxy comprises a polygonal mesh.

18. The non-transitory computer-readable medium of claim 15, wherein the operation of rendering the high-fidelity image further comprises rendering the high-fidelity model in a virtual scene.

19. The non-transitory computer-readable medium of claim 15, wherein the operations further comprise:

accessing images of a real-world 3D object; and using at least one of the images to encode the high-fidelity model of the target 3D asset.

20. The non-transitory computer-readable medium of claim 15, wherein the operation of rendering the high-fidelity image further comprises deploying the high-fidelity model to a remote device for the rendering.

\* \* \* \* \*